United States Patent [19]

Newcombe

[11] 4,374,734
[45] Feb. 22, 1983

[54] EMULSION BREAKING OF SURFACTANT STABILIZED CRUDE OIL IN WATER EMULSIONS

[75] Inventor: Jack Newcombe, Tulsa, Okla.

[73] Assignee: Cities Service Co., Tulsa, Okla.

[21] Appl. No.: 275,473

[22] Filed: Jun. 19, 1981

[51] Int. Cl.$^3$ ............................................. B01D 17/04
[52] U.S. Cl. .................................... 210/708; 208/188; 210/728; 252/344; 252/358; 210/708;725;727–729
[58] Field of Search ................ 208/188; 252/331, 344, 252/358

[56] References Cited

U.S. PATENT DOCUMENTS

| | | | |
|---|---|---|---|
| 2,050,924 | 8/1936 | DeGroote | 252/344 |
| 3,487,928 | 1/1970 | Canevarii | 210/708 |
| 3,835,060 | 9/1974 | Maddox et al. | 252/332 |
| 3,873,452 | 3/1975 | Donham | 252/341 |
| 3,907,701 | 9/1975 | Liebold et al. | 252/348 |
| 4,029,570 | 6/1977 | Coffman et al. | 208/188 |
| 4,184,949 | 1/1980 | Sader | 210/727 |
| 4,216,079 | 8/1980 | Newcombe | 208/188 |
| 4,261,812 | 4/1981 | Newcombe | 208/188 |
| 4,321,147 | 3/1982 | McCoy et al. | 208/188 |

FOREIGN PATENT DOCUMENTS

| | | | |
|---|---|---|---|
| 1166400 | 3/1964 | Fed. Rep. of Germany | 208/188 |
| 187913 | 11/1966 | U.S.S.R. | 208/188 |

Primary Examiner—Peter A. Hruskoci
Attorney, Agent, or Firm—Richard D. Stone; George L. Rushton

[57] ABSTRACT

A process useful for breaking oil in water emulsions produced as the result of a surfactant flood oil recovery project is disclosed. The produced oil in water emulsion, stabilized with surfactants, content is treated with brine and a polyol or quaternary ammonium compound, or both, followed by mixing and settling to form a sprung oil phase and a brine phase.

8 Claims, No Drawings

EMULSION BREAKING OF SURFACTANT STABILIZED CRUDE OIL IN WATER EMULSIONS

BACKGROUND OF THE INVENTION

This invention relates to the recovery of petroleum from underground reservoirs and pertains in particular to the breaking of emulsions of crude oil and water that are recovered from a producing well of the reservoir in an enhanced recovery process.

Because oil is generally in short supply, petroleum technologists have tried to extract a greater amount of the oil in place in a given reservoir. After a primary recovery has been completed, secondary recovery, or water injection, is frequently begun to displace more of the oil. Even after no more oil can be displaced from a formation by water injection, there is frequently still quite a lot of oil in the ground which can be recovered by a tertiary recovery operation. Most tertiary recovery projects use surface active agents to scrub the oil out of the rocks or sands in which the oil is found, permitting displacement of the oil to producing well.

The surfactants which are added, usually petroleum sulfonates or derivatives thereof, have a built-in defect. Surface active agents which are efficient at removing petroleum from a reservoir are difficult to remove from the petroleum once it has been produced.

In most enhanced recovery processes, significant amounts of water will be produced, along with the oil, usually in the form of very stable emulsions. Breaking of emulsions produced in a tertiary recovery operation is difficult because the surfactant stabilizes the emulsions. Frequently, there is not much oil present in the emulsions, from 1–30 lv % oil includes most of the emulsions to be produced, with 10–20 lv % oil being more commonly encountered as the surfactant is being produced.

The emulsions are oil-in-water, or o/w, emulsions. These emulsions are not usually encountered in petroleum production where the expected form is a water-in-oil, w/o, emulsion. Conventional emulsion breaking techniques which work on a w/o emulsion are ineffective in breaking an o/w emulsion.

PRIOR ART

An excellent method of breaking an oil-in-water emulsion produced by a surfactant flood is given in U.S. Pat. No. 4,029,570 (Class 208/188), Coffman et al., the teachings of which are incorporated by reference. Coffman contacts an emulsion with formation brine to produce a sprung oil phase and a water phase. This method will break o/w emulsions characterized by high surfactant contents; however, the produced oil phase sometimes contains unacceptable amounts of water. The '570 patent shows, in Example IV, that 100 ml of crude oil was recovered as 108 ml of sprung oil, presumably containing 8 ml, approximately, of water. The generally accepted maximum limit on water in crude is less than 1% for transmission of the crude oil by pipeline, so further treatment of the oil produced in Example IV of that patent would be needed.

Some other work has been done on breaking oil-in-water emulsions by intimate mixing with an aqueous solution of an electrolyte, e.g., sodium carbonate and subsequent separation under the action of a high-voltage electric field. Reported in Berkman and Egloff, *Emulsions and Foams,* 1941, Page 292.

An effective emulsion breaking process is described in U.S. Ser. No. 011,335, filed Feb. 12, 1979, and assigned to a common assignee with the present application. An emulsion was broken by passing the emulsion over a fixed bed or aqueous slurry of compounds with limited solubility, which broke the emulsion. Especially preferred was the use of gypsum.

Much work has been done on purifying and concentrating surfactants as part of the surfactant manufacturing process.

The lower alcohols, usually isopropyl alcohol, are used to extract petroleum sulfonates from oleum or sulfur trioxide treated mineral oils during the manufacture of white oils and petroleum sulfonates. Aqueous alcohol solutions, such as 50% isopropyl alcohol are generally used. Typical processes for manufacturing petroleum sulfonates are given in a paper presented at the American Chemical Society Marketing Symposium in New York, N.Y., Apr. 8, 1976, by E. A. Knaggs of Stepan Chemical Company, entitled "The Role of the Independent Surfactant Manufacturer in Tertiary Oil Recovery." See also Bluestein and Bluestein, Petroleum Sulfonates, Anionic Surfactants, Part II, Chapter 9, pages 318, 319, Surfactant Science Series, Marcel Dekker, Inc., 1976.

In ASTM Procedure "D855" for "Analysis of Oil-Soluble Sodium Petroleum Sulfonates," ASTM Standards for Petroleum Products, Part 18, January 1968 Edition, isopropyl alcohol is used to extract petroleum sulfonates from small amounts of oils as the first step in quantitative analysis and to determine the equivalent weight of the sulfonate.

I also discovered a way to break these surfactant stabilized emulsions and recover some of the surfactant. I used a partitioning agent. The preferred partitioning agent is isopropyl alcohol. In this process, settled emulsion forms three phases: an oil phase containing a minor amount of surfactant, a partitioning agent phase containing most of the surfactant originally present in the produced emulsion, and a brine phase. This invention is disclosed in my U.S. Pat. No. 4,216,079 (Class 208/188), the teachings of which are incorporated by reference. This process works well, but sometimes the value of the surfactants recovered does not justify the cost of their recovery.

Much work has been done on treating water-in-oil emulsions, which are the product of a water flood, as opposed to a surfactant water flood. These simple, relatively surfactant-free, w/o emulsions can be broken by treating with polyols, or polymers of ethylene oxide and propylene oxide. References teaching these emulsion breaking processes include U.S. Pat. Nos.:

3,907,701
3,873,452
3,835,060
3,110,682
3,057,890

Some work has been done on breaking emulsions stabilized with anionic surfactants. This work requires use of quaternary ammonium compounds, which react with the anionic surfactants to assist in breaking the emulsion. This work was reported in the Armak Technical Bulletin, 72-12.

I have discovered a process to break surfactant stabilized emulsions, which process is both relatively simple and inexpensive.

SUMMARY OF THE INVENTION

I have discovered an efficient way of breaking an oil-in-water emulsion produced as a result of a surfactant flood by contacting the emulsion with brine and a polyol or quaternary ammonium compound or mixture thereof.

Accordingly, the present invention provides a process for recovering crude oil, water, and surface active agents from an oil-in-water emulsion recovered from an oil reservoir, the improvement comprising adding sufficient brine and emulsion breaking agents selected from the group of a polyol, a quaternary ammonium compound, and mixtures thereof, mixing said added brine and emulsion breaking reagent with said emulsion to break said emulsion and recover a sprung oil phase.

In another embodiment, the present invention provides a process for recovering crude oil from an oil-in-water emulsion comprising crude oil, water, and petroleum sulfonate surface active agents with an equivalent weight of 350 to 500, said process comprising adding brine, quaternary ammonium compound, and polyol to said emulsion, mixing and recovering from said emulsion a sprung oil phase of reduced water content.

DETAILED DESCRIPTION

The emulsions which can be treated in the practice of the present invention are any oil-in-water emulsions characterized by the presence of surface active agents. These emulsions may contain 1 to 30 lv % oil with the remainder being primarily water. Surfactant concentration may range from 50 ppm to 15 wt %, based on the amount of active petroleum sulfonate or other surface active material in the total emulsion. The upper limit on surfactant content is a very high one and would never intentionally be encountered in the field. Such a high surfactant concentration might be seen as the result of a fracture occurring around an injection well, or somewhere in the formation, causing by-passing of the surfactant more or less directly to a producing well. When this happens, an operator will be faced with an emulsion which is extremely difficult to break.

The exact surface active agent used will be a matter of economics, the reservoir, and similar considerations. Petroleum sulfonates, alkyl sulfates, alkyl sulfonates, alkyl-aryl sulfonates, alkylphenoxy sulfates, and sulfated alcohol ethoxyates, sulfated alkylphenoxy ethoxyates, nonionic surfactants and other surfactants that have lesser solubility in salt solutions than in fresh water can be treated by the practice of my invention.

Many other materials may be present in the produced fluid. Sodium silicate, sodium hydroxide or other alkaline materials may be present as the remains of an earlier alkaline flood of the formation or from a preflush before the surfactant fluid was injected into the formation. Water thickeners such as polyacrylamides, biopolymers or sugars may be present. These materials are frequently added to one or more steps of a tertiary oil recovery process for mobility control. Sometimes alcohol, such as secondary butyl alcohol, or ethers, e.g., ethylene glycol monobutyl ether, are added to the surfactant flood. There is usually quite a lot of salts present in the produced fluids. Salts are frequently added to the surfactant flood, and are almost invariably found in the connate water in the formation.

The quaternary ammonium compounds used can include any readily available materials of this type. Suitable compounds include: cocotrimethylammonium chloride, hexadecyltrimethylammonium chloride, dicocodimethylammonium chloride, methylenebis (2-hydroxyethyl)-cocoammonium chloride, cocoimidazolinebenzyl chloride, diocytldimethylammonium chloride, didecyldimethylammonium chloride, diisobutylphenoxyethyldimethylbenzyl-ammonium chloride, and diisobutylcresoxyethoxyethyldimethylbenzylammonium chloride.

Alkyldimethylbenzylammonium chlorides, dialkyldimethylammonium chlorides, alkyltrimethylammonium chlorides and imidazolinium chlorides also should work well. Preferred molecular weights may depend on the surfactant content and balance in the emulsion. Quaternary surfactant molecular weights from 200 to 700 should be acceptable, with 250 to 500 mw preferred.

Polyoxypropylene polyols of molecular weight above 900, preferably 1,000 to 10,000, and most preferably between 2000 and 4500 are best. Higher molecular weight materials are not readily available commercially. Derivatives such as the triols and tetraols seem to be slightly more efficient than diols in the cases studied, but the diol may be preferable, depending again on the surfactant content and balance of the emulsion.

Some fine tuning of the amounts and type of my emulsion breading additives may be necessary to optimize this process for each field encountered. Some general guidelines can be given, however.

If the produced emulsion contains only a little surfactant, simply breaking the emulsion with brine may produce sprung oil with sufficiently low water content to permit pipelining of the oil. Nothing more than the practice of U.S. Pat. No. 4,029,570 is required.

Many times the surfactant content is relatively higher, e.g. the oil phase contains between 1–20 wt % sulfonate. Expressed as wt % of the total emulsion, such an emulsion contains between 0.2 and 10 wt % surfactant. The effective lower limit of surfactant concentration at which the present invention is necessary can be determined by simple field testing. If adding brine to the produced emulsion breaks the emulsion, but produces a sprung oil phase with too much water, practicing the present invention will lower the water content of the sprung oil to an acceptable level.

Usually a mixture of quaternary ammonium compound and polyols with brines will allow the most economical treatment. This is especially true when the surfactant content of the emulsion is a relatively balanced system, such as that obtained when using sodium petroleum sulfonate, with an average equivalent weight, ew, of 410 to 440. If the surfactant in the emulsion is highly hydrophilic, such as a 378 ew sulfonate, or if the emulsion contains added hydrophilic surfactants, such as are found in some water external surfactant floods, then quaternary ammonium compounds will be more effective than polyols. In the case of highly hydrophobic systems, such as sodium petroleum sulfonates with an equivalent molecular weight of 440, the use of a polyol alone in addition to brine will probably be the most efficient treatment.

Cost will also be a large consideration. Currently, quaternary ammonium compounds cost from 2 to 3 times as much per pound of active ingredients as do the polyoxypropylene polyols, except for pyridinium chlorides, which cost about 10 times as much as the polyols.

EXAMPLES

A number of experiments were performed on different emulsions. Two different types of oil-external micellar fluids were used.

"69 OIL"

Sodium petroleum sulfonate 1.28 g/100 ml fluid
n-Butylcellosolve 0.24 g/100 ml fluid
Water 0.40 g/100 ml fluid
Balance crude oil to make up to 100 ml volume The average equivalent weight of the sulfonate used in this oil was 421, with the following distribution:
ew 346—18 wt %
ew 346-466 39 wt %
ew 466+ 43 wt %

The crude oil was a field crude of 35° API gravity and 5.1 centipoise viscosity at 75 F.

"OIL B"

Sodium petroleum sulfonate, 1.129 g/100 ml
n-Butylcellosolve, 0.40 g/100 ml
Water, 0.80 g/100 ml
Balance crude oil to make up to 100 ml The average equivalent weight of the sulfonate used in the "Oil B" was 378, with the following distribution:
ew average 340=53.9 wt %
ew average 422.5=37.1 wt %
ew average 500=9.0 wt %

Oil-in-water emulsions were prepared by mixing e.g., 130 ml of "69 Oil" or "Oil B" with 455 ml of deionized water for two minutes at the high speed of a Waring blender. This produces 585 ml of an emulsion consisting of 130 ml of "69 Oil" or "Oil B" and 455 ml of deionized water. These emulsions were stable for several days with only a small amount of creaming.

EXAMPLE 1

An oil-in-water emulsion was prepared by mixing 130 ml "69 Oil" with 455 ml of deionized water for 2 minutes at the high speed of a laboratory Waring blender. Exactly 90 ml of this emulsion was placed in a stoppered 100 ml graduated cylinder. This cylinder contained exactly 20 ml of micellar fluid, or 20 ml of "69 Oil." The chemicals to be tested were added to the emulsion, and then the volume was adjusted to 100 ml by adding deionized water.

The test chemicals were made up as a 2 wt % solution. 5 ml of chemical solution added to the emulsion, followed by the addition of 5 ml of deionized water would give a 1000 ppm concentration of test chemical in the emulsion in the graduated cylinder. After the test chemical was added and the volume of emulsion adjusted to 100 ml, the graduate was shaken vigorously by hand for 2 minutes and then allowed to stand for 24 hours. Observations were made for breaking of the emulsion at the following intervals: 1 minute, 5 minutes, 15 minutes, 30 minutes, 1 hour, 2 hours, 4 hours, and 24 hours. If the emulsion broke, 10 ml of sample was withdrawn after the 24-hour period has elapsed for water analysis by the Karl Fisher technique. If the emulsion did not break, 10 ml of formation brine containing 10 wt % salts was added. This is equivalent to about 10,000 ppm salts added to the emulsion. The graduate was then reshaken for 2 minutes and allowed to stand for 24 hours.

The formation brine added to the emulsions contained 10 wt % salts, broken down as follows:
Sodium chloride 84.8 wt %
Potassium chloride 0.3 wt %
Calcium chloride 6.1 wt %
Magnesium chloride 8.1 wt %
Barium chloride 0.7 wt %

Four control tests were run using no additive whatever. In these tests, to 90 ml of the emulsion was added 10 ml of water. After standing 1 hour, no change was observed. After 24 hours, 6 ml of O/w emulsion had separated as cream, with 94 ml of o/w emulsion remaining essentially as when first added to the graduate. After adding 10 ml of formation brine, the emulsion broke immediately to give, after 1 hour, 25 ml of a dark brown micro w/o emulsion upper phase, and 85 ml of dirty, hazy water as a bottom phase. After standing 24 hours, 21 m of a black, micro w/o emulsion top phase was observed, with a dirty water bottom phase of 89 ml. In four separate tests, the water content of the oil phase was found to be 5.8, 5.6, 5.7, and 5.5 wt % water as determined by the Karl Fischer method.

When adding chemicals, the following procedure was used: Add to 90 ml of emulsion exactly 5 ml of a 2% solution of the chemical to be tested, e.g., sodium lauryl sulfate, then add sufficient water to adjust the volume to 100 ml. This gives 1,000 ppm of sodium lauryl sulfate in emulsion. Shaking the emulsion and allowing it to settle produced the following results:

1 hour—no change, 100 ml of o/w emulsion
24 hours—5 ml of cream or o/w emulsion, and 95 ml of o/w emulsion After adding 10 ml of brine and shaking, the emulsion broke immediately. After settling for one hour, the upper phase consisted of 24 ml of macro w/o emulsion, and the lower phase was 86 ml of dirty water.

After 24 hours, the upper phase consisted of 23 ml of macro w/o emulsion, and 87 ml of dirty water.

The oil phase was analyzed, at the end of the 24-hour period. It contained 10.6 wt % water. This shows that adding sodium lauryl sulfate, which is a surfactant, does not help reduce the water content of the sprung oil; in fact, the water content increases.

This screening method was used to test a number of quaternary ammonium compounds at 1,000 ppm, both with and without formation brine. The results are reported in Table I.

The experimental results, shown in Table I, show that quaternary ammonium compounds when used alone do have some breaking effect, but not enough to warrant further testing. With brine, the quaternary ammonium compounds give good breaking to produce a sprung oil containing very small amounts of water.

As used in Table I, the emulsion characteristics refer to the following:
io—micro water-in-oil
ao—macro water-in-oil
iw—micro oil-in-water
aw—macro oil-in-water
dw—dirty water
hw—hazy water
cw—clear water

TABLE I

| Additive | Brine | Setting Time | wt % H₂O in Oil | Emulsion Characteristics | | | | | | |
|---|---|---|---|---|---|---|---|---|---|---|
| | | | | io | ao | iw | aw | dw | hw | cw |
| Dodecyltrimethyl-ammonium chloride mw 264 | No | 1 hour | | | 6 | | 94 | | | |
| | | 24 hours | | | 17 | | 83 | | | |
| Dodecyltrimethyl-ammonium chloride mw 264 | Yes | 1 hour | | 20 | | 1 | 89 | | | |
| | | 24 hours | 0.3 | 20 | | | 90 | | | |
| Methyldodecyltri-methylammonium chloride mw 369 | No | 1 hour | | | 2 | | 98 | | | |
| | | 24 hours | | | 2 | | 98 | | | |
| Methyldodecyltri-methylammonium chloride mw 369 | Yes | 1 hour | | 20 | | | | 90 | | |
| | | 24 hours | 0.3 | 20 | | | | 90 | | |
| Beta-hydroxyethylbenzyl "coco"imidazolinium chloride mw 409 | No | 1 hour | | | 1 | | 99 | | | |
| | | 24 hours | | | 11 | | 89 | | | |
| Beta-hydroxyethylbenzyl "coco"imidazolinium chloride mw 409 | Yes | 1 hour | | 20 | | | | 90 | | |
| | | 24 hours | 0.1 | 20 | | | | 90 | | |
| Laurylpyridinium chloride, mw 284 | No | 1 hour | | | | | 8/92 | | | |
| | | 24 hours | | | 18 | | 82 | | | |
| Laurylpyridinium chloride, mw 284 | Yes | 1 hour | | 20 | | | | 90 | | |
| | | 24 hours | 0.1 | 20 | | | | 90 | | |

EXAMPLE 2

A group of polyoxypropylene polyols was tested using the procedure and sample emulsion shown in Example 1. The emulsion tested contained 20 ml "69 oil" and 70 ml deionized water. Polyol was added to the emulsion, which was diluted to 100 ml, shaken for 2 minutes, settled for 24 hours, and then brine was added, followed by shaking and 24 hours settling. Two series of polyoxypropylene polyols having different molecular weights were tested at various concentrations. The Niax PPG series are polypropylene glycols. The Pluracol TP series are polyoxypropylene adducts of trimethylolpropane. The numbers indicate the approximate molecular weights of the compounds. These compounds, when used alone, had no breaking action on the o/w emulsion. When used with brine, these polyols were effective in springing low water content oil, when the polyol had a mw above 100. These test results are shown in Table II.

TABLE II
POLYOLS AND BRINE

| Exp. | Polyol | PPM Polyol in Emulsion | Wt % H₂O in Sprung Oil |
|---|---|---|---|
| 173, 186, 195, & 226 | None | 1000 | 5.7 ave. |
| 189 | Pluracol TP 440 | 1000 | 6.2 |
| 190 | Pluracol TP 740 | 1000 | 6.1 |
| 229 | Pluracol TP 1540 | 100 | 4.9 |
| 230 | Pluracol TP 1540 | 500 | 1.0 |
| 191 | Pluracol TP 1540 | 1000 | 0.4 |
| 223 | Pluracol TP 2540 | 100 | 2.4 |
| 232 | Pluracol TP 2540 | 500 | 0.72 |
| 233 | Pluracol TP 2540 | 1000 | 0.94 |
| 234 | Pluracol TP 2540 | 2000 | 2.4 |
| 235 | Pluracol TP 4040 | 100 | 1.4 |
| 236 | Pluracol TP 4040 | 500 | 0.86 |
| 109 | Pluracol TP 4040 | 1000 | 0.9 |
| 192 | Pluracol TP 4040 | 1000 | 0.7 |
| 237 | Pluracol TP 4040 | 2000 | 1.9 |
| 168 | Niax PPG 425 | 1000 | 14.5 |
| 169 | Niax PPG 1025 | 1000 | 4.5 |
| 170 | Niax PPG 2025 | 1000 | 0.4 |
| 171 | Niax PPG 3025 | 1000 | 0.5 |
| 183 | Niax PPG 4025 | 100 | 2.1 |
| 184 | Niax PPG 4025 | 500 | 1.5 |
| 172 | Niax PPG 4025 | 1000 | 0.6 |
| 185 | Niax PPG 4025 | 2000 | 0.4 |

EXAMPLE 3

Combinations of quaternary ammonium compounds and polyoxypropylene polyols, used with brine, for breaking these emulsions were also tested using the same procedure shown in Example 1. The Quats tested were:

Quat 472 Dodecyltrimethylammonium chloride
Quat 500 Laurylpyridinium chloride
Quat 484 Methyldodecyltrimethylammonium chloride
Quat 497 Beta-Hydroxylethylbenzyl "coco" Imidazolinium chloride.

These test results are shown in Table III.

TABLE III
COMBINATIONS OF POLYGLYCOLS WITH QUATERNARY SURFACTANTS AND BRINE

| Exp. | Polyol/Quat | PPM Quat. in Emulsion | Wt % H₂O in Sprung Oil |
|---|---|---|---|
| 222 | Pluracol TP 4040 | 500 | |
| | Quat. 472 | 500 | 0.6 |
| 223 | Pluracol TP 4040 | 500 | |
| | Quat. 500 | 500 | 0.5 |
| 199 | Niax PPG 4025 | 500 | |
| | Quat. 472 | 500 | 0.8 |
| 225 | Niax PPG 4025 | 500 | |
| | Quat. 484 | 500 | 0.7 |
| 224 | Niax PPG 4025 | 500 | |
| | Quat. 497 | 500 | 0.6 |
| 200 | Niax PPG 4025 | 500 | |
| | Quat. 500 | 500 | 0.6 |

EXAMPLE 4

A variation of the previous procedures was used to screen a number of quaternary ammonium compounds at concentrations of 100 ppm and higher. 85 ml of o/w emulsion containing 20 ml of "69 Oil" was treated with quaternary surfactants at concentrations of 100 ppm, 200 ppm, 500 ppm, and 1000 ppm. After adding surfactant the emulsion was allowed to stand 1 hour. Then 10 ml of formation brine fortified with 10 wt % sodium chloride was added, the volume adjusted to 100 ml, and hand shaken for 2 minutes. After standing 24 hours, a sample of oil was removed for water analysis. Results of the tests given in Table IV show that all of the quaternaries tests were effective but that dialkyldimethylammonium chloride and alkylbenzyldimethylammonium chloride quaternaries were more effective at low concentrations. Without surfactant 5.5 wt % water was contained in oil sprung with brine.

TABLE IV

QUATERNARY SURFACTANTS WITH BRINE

| Quaternary Surfactant Properties Approximate Cost | Conc. PPM | After 24 hrs., wt % Water, KF |
|---|---|---|
| Arquad C: | 100 | 2.10 |
| Cocotrimethylammonium | 200 | 1.80 |
| Chloride, mw 278, | 500 | 0.85 |
| $1.26/lb. | 1000 | 0.81 |
| Unamine C: | | |
| 1-hydroxyethyl-2-coco- | 100 | 1.79 |
| imidazoline, mw 286, | 200 | 1.31 |
| $1.07/lb. | 500 | 0.98 |
| | 1000 | 0.74 |
| Bardac LF: | | |
| Dioctyldimethylammonium | 100 | 1.36 |
| chloride, mw 306, | 200 | 1.15 |
| $1.42/lb. | 500 | 0.47 |
| | 1000 | 0.30 |
| Arquad 16: | 100 | 3.15 |
| Hexadecyltrimethyl- | 200 | — |
| ammonium chloride, mw 319 | 500 | 1.34 |
| $1.24/lb. | 1000 | 0.82 |
| Arquad T | 100 | 3.00 |
| Tallowtrimethylammonium | 200 | — |
| chloride, mw 340 | 500 | 1.24 |
| $1.08/lb. | 1000 | 0.72 |
| Arquad S | 100 | 2.75 |
| Soyatrimethylammonium | 200 | 2.99 |
| chloride, mw 342, | 500 | 1.19 |
| $1.38/lb | 1000 | 0.68 |
| Adogen 415 | 100 | 2.17 |
| Soyatrimethylammonium | 200 | 2.99 |
| chloride, mw 342, | 500 | 1.19 |
| | 1000 | 0.77 |
| Maquat MC 1412 - | 100 | 1.51 |
| C12, C14, C16 | 200 | 1.09 |
| Alkyldimethylbenzyl- | 500 | 0.59 |
| ammonium chloride | 1000 | 0.37 |
| mw 358, $1.46/lb | | |
| Variquat 50 MC | 100 | 1.43 |
| C12, C14, C16 | 200 | 1.09 |
| alkyldimethylbenzyl- | 500 | 0.59 |
| ammonium chloride | 1000 | 0.37 |
| mw 358, | | |
| Bardac 22 | 100 | 1.65 |
| Didecyldimethyl- | 200 | 1.16 |
| ammonium chloride | 500 | 0.56 |
| mw 362, $1.42/lb | 1000 | 0.35 |
| Maquat MC 1416 | 100 | 1.59 |
| C12, C14, C16, C18- | 200 | 1.16 |
| Alkyldimethylbenzyl- | 500 | 0.61 |
| ammonium chloride | 1000 | 0.41 |
| mw 380, $1.46/lb | | |
| Arquad T-2C | 100 | 2.45 |
| Mixed Mono- and | 200 | 1.87 |
| dialkylammonium chloride | 500 | 0.87 |
| quaternary | 1000 | 0.32 |
| mw 394, $1.58/lb | | |
| Arquad S-2C | 100 | 2.61 |
| Mixed Mono- and | 200 | 1.93 |
| dialkylammonium chloride | 500 | 0.94 |
| quaternary | 1000 | 0.51 |
| mw 395, $1.60/lb | | |
| Uniquat CB-50 | 100 | 2.16 |
| Cocoimidazolinebenzyl- | 200 | 1.59 |
| chloride | 500 | 0.84 |
| mw 413, $1.42/lb | 1000 | 0.49 |

TABLE IV-continued

QUATERNARY SURFACTANTS WITH BRINE

| Quaternary Surfactant Properties Approximate Cost | Conc. PPM | After 24 hrs., wt % Water, KF |
|---|---|---|
| Variquat C-75 | 100 | 2.47 |
| Dicocoimidazoline | 200 | 1.61 |
| chloride | 500 | 0.97 |
| mw 432 | 1000 | 0.81 |
| Arquad 2C | 100 | 1.98 |
| Dicocodimethyl | 200 | 1.22 |
| ammonium chloride | 500 | 0.64 |
| mw 447, $1.11/lb | 1000 | 1.23 |
| Varisoft K-75 | 100 | 2.64 |
| Dialkylimidazoline- | 200 | 1.69 |
| chloride quaternary | 500 | 1.00 |
| mw 489 | 1000 | 0.83 |
| 442 - Dyhydrogenatedtallow | 100 | 2.27 |
| dimethylammonium chloride | 200 | 1.49 |
| mw 586 | 500 | 0.80 |
| | 1000 | 6.67 |
| Arquad 2S | 100 | 2.84 |
| disoyadimethyl | 200 | 2.21 |
| ammonium chloride | 500 | 1.11 |
| mw 605, $1.56 | 1000 | 2.34 |

EXAMPLE 5

A number of polyoxypropylene polyols were tested for breaking 20 lv % oil, oil-in-water emulsions prepared from "69 Oil" as in Example 1. The term functionality is defined as the number of functional groups. Results are given in Table V. Without added polyol, 5.5 wt % water was contained in oil sprung by brine.

TABLE V

SCREENING OF SELECTED POLYPROPYLENE POLYOLS FOR BREAKING O/W EMULSIONS OF JN69 OIL

Emulsion: 85 ml of o/w containing 20 ml of JN 69 oil and dionized water.
Procedure: Add polyol, allow to stand 1 hr., add 10 ml of brine fortified with 10% NaCl, add water to 100 ml, hand shake 2 minutes.

| Polypropylene Polyol Properties | Conc. PPM | wt. % Water KF |
|---|---|---|
| Niax PPG-2025, | 100 | 2.16 |
| Functionality 2 | 200 | 2.23 |
| mw 2000 | 500 | 1.80 |
| | 1000 | 0.40 |
| Pluracol 479, | 100 | 3.39 |
| Functionality, 2 | 200 | 1.83 |
| mw 2750 | 500 | 0.53 |
| $0.4585/lb | 1000 | 0.56 |
| Niax PPG 3025 | 100 | 1.85 |
| Functionality 2 | 200 | 1.94 |
| mw 3000 | 500 | 1.36 |
| | 1000 | 0.50 |
| Niax PPG 4025 | 100 | 2.04 |
| Functionality 2 | 200 | 2.03 |
| mw 4000 | 500 | 1.40 |
| | 1000 | 0.6 |
| Pluracol TP 1540 | 100 | 3.49 |
| Functionality 3 | 200 | 2.67 |
| mw 1560 | 500 | 1.18 |
| $0.4585/lb | 1000 | 0.40 |
| Pluracol TP 2540 | 100 | 2.16 |
| Functionality 3 | 200 | 1.98 |
| mw 2640 | 500 | 0.62 |
| $0.4585/lb | 1000 | 0.94 |
| | 2000 | 2.40 |
| Varanol 4301 | 100 | 2.26 |
| Functionality 3 | 200 | 1.94 |
| mw 3000 | 500 | 0.49 |
| | 1000 | 1.05 |
| Varanol 4371 | 100 | 1.91 |
| Functionality 3 | 200 | 1.84 |
| mw 3700 | 500 | 0.55 |

TABLE V-continued
SCREENING OF SELECTED POLYPROPYLENE POLYOLS FOR BREAKING O/W EMULSIONS OF JN69 OIL Emulsion: 85 ml of o/w containing 20 ml of JN 69 oil and dionized water.
Procedure: Add polyol, allow to stand 1 hr., add 10 ml of brine fortified with 10% NaCl, add water to 100 ml, hand shake 2 minutes.

| Polypropylene Polyol Properties | Conc. PPM | wt. % Water KF |
|---|---|---|
|  | 1000 | 0.80 |
| Varanol 3741 | 100 | 1.83 |
| Functionality 3 | 200 | 1.64 |
| mw 4000 | 500 | 0.57 |
|  | 1000 | 1.13 |
| Pluracol TP 4040 | 100 | 2.05 |
| Functionality 3 | 200 | 1.77 |
| mw 4100 | 250 | 1.47 |
|  | 500 | 0.57 |
|  | 1000 | 0.80 |
|  | 2000 | 1.90 |
| Pluracol 494 | 100 | 1.88 |
| Functionality 3 | 200 | 1.38 |
| mw 4750 | 250 | 0.85 |
|  | 500 | 0.33 |
|  | 1000 | 0.45 |

EXAMPLE 6

Combinations of four quaternary surfactants and two polyoxypropylene glycols were tested for springing oil from "69 Oil" emulsion as in Example I. Concentrations of combinations were selected to minimize cost. Results of these tests are presented in Table VI. Identity of the quaternary surfactants and polyoxypropylene glycols is given in earlier Tables, so no properties of these materials are presented in Table VI.

TABLE VI
SCREENING OF SELECTED QUATERNARY SURFACTANTS AND POLYOXYPROPYLENE POLYOLS TO MINIMIZE COST

| Exp. No. | Quaternary | Conc. PPM | Polyol | Conc. PPM | Water After 24 Hours Wt. % |
|---|---|---|---|---|---|
| 276 | None | — | Varanol 3741 | — | 4.73 |
| 255 | Arquad C | 226 | Varanol 3741 | 0 | 2.13 |
| 260 | Arquad C | 200 | Varanol 3741 | 82 | 1.28 |
| 259 | Arquad C | 150 | Varanol 3741 | 235 | 1.20 |
| 258 | Arquad C | 100 | Varanol 3741 | 400 | 0.57 |
| 257 | Arquad C | 50 | Varanol 3741 | 540 | 0.35 |
| 256 | Arquad C | 0 | Varanol 3741 | 700 | 0.80 |
| 271 | Bardac LF | 200 | Pluracol TP4040 | 0 | 1.23 |
| 274 | Bardac LF | 150 | Pluracol TP4040 | 156 | 1.10 |
| 373 | Bardac LF | 100 | Pluracol TP4040 | 312 | 1.19 |
| 272 | Bardac LF | 50 | Pluracol TP4040 | 467 | 0.72 |
| 265 | Bardac LF | 0 | Pluracol TP4040 | 625 | 0.53 |
| 261 | MC 1412 | 200 | Pluracol TP4040 | 0 | 1.28 |
| 264 | MC 1412 | 150 | Pluracol TP4040 | 156 | 1.29 |
| 363 | MC 1412 | 100 | Pluracol TP4040 | 312 | 1.32 |
| 262 | MC 1412 | 50 | Pluracol TP4040 | 467 | 0.67 |
| 265 | MC 1412 | 0 | Pluracol TP4040 | 625 | 0.53 |
| 266 | Arquad 2C | 257 | Varanol 3741 | 0 | 1.34 |
| 270 | Arquad 2C | 200 | Varanol 3741 | 153 | 1.17 |
| 269 | Arquad 2C | 150 | Varanol 3741 | 290 | 0.85 |
| 268 | Arquad 2C | 100 | Varanol 3741 | 425 | 0.46 |
| 267 | Arquad 2C | 50 | Varanol 3741 | 560 | 0.44 |
| 256 | Arquad 2C | 0 | Varanol 3741 | 700 | 0.80 |

Note:
The relative cost of the total amount of emulsion breaking materials in each test is about the same.

EXAMPLE 7

A number of treating companies market breakers for treating oil-in-water emulsions. Some of these breakers were designed to break oil-in-water emulsions containing only low concentrations of oil such as oily waste waters. Other breakers are being sold and tested for breaking oil-in-water emulsions produced in tertiary and secondary recovery operations performed with micellar fluids. These chemicals are known as reverse breakers and are about $5.00 per gallon of breaker that contains 10% active breaker component. These products are complex mixtures of materials in some cases containing organic polyelectrolytes.

Results shown in Table VII indicate that some of these reverse breakers are effective at concentrations of 500 ppm based on the emulsion. No brine was used in the examples shown. Calculations show that chemical costs would be in the range of $5.00 per barrel of oil recovered when used at 500 ppm concentration of active component. This is about 10 times the cost of the breakers shown in Table VI, i.e., use of brine, quaternary surfactant and polyoxypropylene polyol.

TABLE VII
(Prior Art)

| Breaker | Exp. No. | ppm | Time Hours | Emulsion Characteristics | | | | | | Wt % H$_2$O in Oil[2] |
|---|---|---|---|---|---|---|---|---|---|---|
|  |  |  |  | io | ao | aw | dw | hw | cw |  |
| None | 76-35 | 0 | 1 |  |  | 100 |  |  |  |  |
|  |  |  | 24 |  |  | 5/95 |  |  |  |  |
| Betz EB-225 | 95-12 | 50 | 1 |  |  | 100 |  |  |  |  |
|  |  |  | 24 |  |  | 6/94 |  |  |  |  |
|  |  | 100 | 1 |  |  | 1/99 |  |  |  |  |
|  |  | 100 | 1 |  |  | 1/99 |  |  |  |  |
|  |  |  | 24 |  |  | 6/94 |  |  |  |  |
|  |  | 500 | 1 |  |  | 15/85 |  |  |  |  |
|  |  |  | 24 |  |  | 20/80 |  |  |  |  |
|  |  | 1000 | 1 |  | 20 | 80 |  |  |  |  |
|  |  |  | 24 |  | 20 | 80 |  |  |  |  |
|  |  | 2000 | 1 |  | 22 |  |  | 78 |  |  |
|  |  |  | 24 |  | 20 |  |  | 80 |  |  |
| Champian X-J11 | 95-6 | 100 | 1 | ⅔ |  | 95 |  |  |  |  |
|  |  |  | 24 | 5 |  | 95 |  |  |  |  |
|  |  | 500 | 1 | 20 |  |  |  | 80 |  |  |
|  |  |  | 24 | 20 |  |  |  | 80 |  | 1.0 |

TABLE VII-continued
(Prior Art)

| Breaker | Exp. No. | ppm | Time Hours | io | ao | aw | dw | hw | cw | Wt % H₂O in Oil[2] |
|---|---|---|---|---|---|---|---|---|---|---|
| | | 1000 | 1 | | 21 | | 79 | | | |
| | | | 24 | 20 | | | 80 | | | 1.0 |
| Champian X-211 | 95-7 | 100 | 1 | | 5 | 95 | | | | |
| | | | 24 | 2 | 4 | 94 | | | | |
| | | 500 | 1 | | 10 | 90 | | | | |
| | | | 24 | 10 | 8 | 82 | | | | |
| | | 1000 | 1 | | 21 | | 79 | | | |
| | | | 24 | 20 | 1 | | | 79 | | 0.5 |
| Champian X-220 | 95-8 | 100 | 1 | 1 | 5 | 94 | | | | |
| | | | 24 | 3 | 4 | 93 | | | | |
| | | 500 | 1 | 20 | t | | 80 | | | |
| | | | 24 | 19 | 2 | | | 79 | | 0.5 |
| | | 1000 | 1 | 20 | 1 | 79 | | | | |
| | | | 24 | 20 | 1 | | | 79 | | 1.3 |
| Champian X-261 | 95-9 | 100 | 1 | | 3 | 97 | | | | |
| | | | 24 | t | 3 | 97 | | | | |
| | | 500 | 1 | | 20/1 | | 79 | | | |
| | | | 24 | 19 | | 1 | | 80 | | 0.4 |
| | | 1000 | 1 | | 21 | | 79 | | | |
| | | | 24 | 20 | 1 | | | 79 | | 5.5 |
| Nalco P55R | 75-1 | 50 | 1 | | 3 | 97 | | | | |
| | | | 24 | | 4 | 96 | | | | |
| | | 100 | 1 | | 6 | 94 | | | | |
| | | | 24 | | 7 | 93 | | | | |
| | | 500 | 1 | | 22/1 | | 77 | | | |
| | | | 24 | 21 | 3 | | 76 | | | 6.1 |
| | | 1000 | 1 | | 21 | | 79 | | | |
| | | | 24 | | 20/2 | | 78 | | | 8.4 |
| Nalco 803 | 95-2 | 50 | 1 | | 3 | 97 | | | | |
| | | | 24 | t | 13 | 87 | | | | |
| | | 100 | 1 | | 7 | 93 | | | | |
| | | | 24 | | 7 | 17/76 | | | | |
| | | 500 | 1 | | 21 | | 79 | | | |
| | | | 24 | 21 | | | 79 | | | 6.1 |
| | | 1000 | 1 | | 21 | | 79 | | | |
| | | | 24 | 20 | 1 | | 79 | | | 2.6 |
| Nalco 805 | 95-3 | 100 | 1 | | | 7/93 | | | | |
| | | | 24 | 1 | 13 | 86 | | | | |
| | | 500 | 1 | | 21/1 | | 78 | | | |
| | | | 24 | 20 | 1 | | | 79 | | 5.7 |
| | | 1000 | 1 | | 22 | | 78 | | | |
| | | | 24 | | 20/2 | | | 78 | | 12.8 |
| Nalco 825 | 95-4 | 100 | 1 | | 10 | 90 | | | | |
| | | | 24 | 10 | | 7/83 | | | | |
| | | 500 | 1 | | 21 | | 79 | | | |
| | | | 24 | 20 | 1 | | 79 | | | 1.2 |
| | | 1000 | 1 | | 22 | | 78 | | | |
| | | | 24 | 20 | 1 | | 79 | | | 5.8 |
| Tretolite J-152 | 95-5 | 100 | 1 | 2 | 5 | 93 | | | | |
| | | | 24 | 4 | | 96 | | | | |
| | | 500 | 1 | t | 20 | | 80 | | | |
| | | | 24 | 20 | t | | 80 | | | 1.6 |
| | | 1000 | 1 | t | 20 | | 80 | | | |
| | | | 24 | 20 | t | | | 80 | | 1.4 |
| United Chem. of N.M. TB 1650 R | 95-10 | 100 | 1 | | 4 | 96 | | | | |
| | | | 24 | 1 | 9 | 90 | | | | |
| | | 500 | 1 | | 24/1 | | 75 | | | |
| | | | 24 | 21 | 1 | | | 78 | | 3.5 |
| | | 1000 | 1 | | 21 | | 79 | | | |
| | | | 24 | 19 | 2 | | 79 | | | 1.6 |
| TB-1651 R | 95-11 | 100 | 1 | | 2 | 98 | | | | |
| | | | 24 | t | 3 | 97 | | | | |
| | | 500 | 1 | | 5 | 95 | | | | |
| | | | 24 | 15 | | 85 | | | | |
| TB-1651 R | 95-11 | 1000 | 1 | | 22 | | 78 | | | |
| | | | 24 | 19 | 2 | | | 79 | | 3.0 |

EXAMPLE 8

Several quaternary surfactants and polypropylene glycols were tested at 500 ppm concentration for breaking a 20 lv % oil, oil-in-water emulsion prepared from "B Oil," previously discussed.

The tests were carried out as in Example 1, except that formation brine containing 10 wt % added sodium chloride was used to break the emulsion after first adding the organic chemical and allowing to stand 24 hours.

Results given in Table VIII show that quaternary surfactants work well with brine in springing oil from this emulsion to allow recovery of low water content oil.

TABLE VIII

| Organic Demulsifier Added, 500 PPM | Mol. Wt. | Wt. % Water After 24 Hrs. |
|---|---|---|
| Control, None Added | — | 9.7 |
| Cocotrimethylammonium chloride | 278 | 1.6 |
| Hexadecyltrimethylammonium chloride | 319 | 1.7 |
| Dicocodimethylammonium chloride | 447 | 1.0 |
| Methylenebis (2-hydroxyethyl)-cocoammonium chloride | 338 | 2.0 |
| Cocoimidazolinebenzyl chloride | 413 | 1.4 |
| Dioctyldimethylammonium chloride | 306 | 0.59 |
| Didecyldimethylammonium chloride | 362 | 0.45 |
| Diisobutylphenoxyethyldimethylbenzyl-ammonium chloride | 466 | 2.2 |
| Diisobutylcresoxyethoxyethyldimethyl-benzylammonium chloride | 480 | 0.77 |
| Polyoxypropylene Polyol, OH #56.1 | 3000 | 4.3 |
| Polyoxypropylene Polyol, OH #34.3 | 4000 | 3.7 |

EXAMPLE 9

The technique of using quaternary surfactants and polyoxypropylene polyols with brine to resolve emulsions prepared from crude oil and water external micellar fluids is shown in this example. The emulsions were prepared by mixing 200 ml of crude oil with 500 ml of micellar fluid containing 0.5 g surfactant per 100 ml of fluid for 2 minutes in a Waring blender. Transfer to a one liter separatory funnel and break emulsion by adding 300 ml of formation brine fortified by addition of 10 wt % sodium chloride, while stirring with a motor-driven paddle stirrer. Continue stirring for 30 minutes and allow to stand 24 hours. Separate water from oil and treat 175 ml of separated oil with 25 ml of brine with stirring for 30 minutes. Allow to stand 24 hours and separate oil and water.

Three different micellar fluids were used to prepare the emulsions. The compositions of the emulsions along with test results are given in Table IX. In the case of Exp. 109C using "100C" micellar fluid, it was necessary to add 300 ppm of polyoxypropylene polyol of 4100 mol. wt. plus 500 ppm of the quaternary surfactant dodecyltrimethylammonium chloride plus brine and to heat for 2 hours at 130° to 150° C. to break the emulsion. This particular emulsion was prepared from micellar fluid in which the average ew of the surfactant was 370.

In all three examples, treatment of 175 ml of oil with 25 ml of brine resulted in a water-in-oil emulsion which separated only slowly after one hour of settling time. Within 15 minutes to 30 minutes after addition of 500 ppm polyoxypropylene polyol and 500 ppm dodecyltrimethylammonium chloride the water-in-oil emulsions became darker and water started to separate. The final water content of the sprung oil was very low for all three micellar fluids studied.

TABLE IX

| Surfactants and polymer used to prepare micellar fluid, g/100 ml micellar fluid | Experiment No. | | |
|---|---|---|---|
| Micellar Fluid No. | 109A "100A" | 109B "100B" | 109C "100C" |
| Sodium petroleum sulfonate, ew 470 | 0.344 | — | — |
| Sodium petroleum sulfonate, ew 422.5 | — | 0.289 | — |
| Sodium petroleum sulfonate, ew 340 | 0.173 | 0.107 | 0.324 |
| Sodium alcohol ethoxy sulfate, mw 442 | 0.094 | 0.104 | 0.176 |
| sec-Butyl Alcohol | 0.124 | 0.138 | 0.124 |
| High Mol. wt. Polyacrylamide polymer | 0.011 | 0.013 | 0.011 |
| Formation brine containing 10% salts | 0.705 | 0.784 | 0.705 |
| Balance fresh water to make 100 ml. of micellar fluid | | | |
| Average surfactant ew | 410 | 405 | 370 |
| Brine used, Formation Brine + 10% NaCl | 300 | 300 | 300 |
| Organic Breakers, ppm polyol ppm quat | none | none | 300 500 |
| Heating | none | none | 2 hrs at 130-150° F. |
| Wt. % water in oil, after separation | 4.7 | 7.1 | 4.7 |
| Treat with 25 ml. of brine plus 500 ppm polyol, 500 ppm quat Water content of oil after separation Wt. % | 0.35 | 0.35 | 0.23 |

UTILITY

Breaking oil-in-water emulsions with added quaternary ammonium compounds and/or polyoxypropylene polyols spring an oil phase containing minimum amounts of water as compared to use of brine alone as a emulsion breaking agent. This treatment seems especially applicable to oil-in-water emulsions stabilized with 0.5 to 3.0 wt % surfactant based on the oil content of the emulsion. If higher concentrations of surfactant are present, it may be more advantageous to break with brine and extract the surfactant from the oil by alcohol and brine treatment as shown in my U.S. Pat. No. 4,216,079. This allows recovery of surfactant for recycle and also produces low water content oil. In case of surfactant contents above 2.5 to 3.0 wt % based on the oil in the oil-in-water emulsion, it may not be practical to add sufficient quaternary ammonium compound or polyoxypropylene to counteract the affect of the surfactant in the emulsion.

Combinations of quaternary ammonium compound and polyoxypropylene polyol with brine are expected in most cases to allow the most economical treatment especially with balanced surfactant systems such as sodium petroleum sulfonate of average equivalent weights of 410 to 400. In case of highly hydrophilic surfactants such as the 378 ew sulfonate, or with added hydrophilic surfactants such as in a water external system, quaternary ammonium compounds will probably be more effective. In the case of more highly hydrophobic systems such as sodium petroleum sulfonates, above 440 average ew, the polyol component will probably be sufficient. Polyoxypropylene polyols range in cost from $0.40 to $0.55/lb. whereas quaternary ammonium compounds sell from $1.10 to $1.80/lb. for all except the pyridinium chlorides which sell at $5.00 to $6.00/lb. A particular combination of chemicals will probably be necessary to give the most economical treatment depending on the surfactant content and balance in the emulsion.

I claim:

1. Process for recovering crude oil from an oil-in-water emulsion comprising crude oil, water, and sufficient petroleum sulfonate surface active agents with an equivalent weight range of 350 to 500 to stabilize said emulsion, said process comprising:
   (a) adding to the emulsion
      (1) an amount of brine equivalent to 1 to 50 wt % of the total emulsion prior to brine addition,
      (2) 100 to 1000 wt ppm of quaternary ammonium surfactant compound with a molecular weight of 200 to 700, based on the original emulsion, and
      (3) 100 to 1000 wt ppm of polyol emulsion breaking reagent with a molecular weight of 1,000 to 10,000, based on the original emulsion,
   (b) mixing the above components to break said oil-in-water emulsion, and
   (c) settling the mixture to recover a sprung, or released, oil phase of reduced water content from a water phase.

2. Process of claim 1, wherein the quaternary ammonium compound is a quaternary ammonium halide.

3. Process of claim 1, wherein the polyol emulsion breaking reagent is a polyoxypropylene polyol.

4. Process of claim 1, wherein the quaternary ammonium compound is selected from the group of dodecyltrimethylammonium chloride, laurylpyridinium chloride, methyldodecyltrimethylammonium chloride, and beta-hydroxylethylbenzyl "coco" imidazolinium chloride.

5. Process of claim 4, wherein the quaternary ammonium compound is dodecyltrimethylammonium chloride.

6. Process of claim 1, wherein the polyol is a polyoxypropylene polyol with a molecular weight of 2000 to 4500.

7. Process of claim 6, wherein the polyol is a polyoxypropylene polyol with a molecular weight of 4000.

8. Process of claim 1, wherein the polyol has a molecular weight of 3500 to 4500 and the quaternary ammonium compound has a molecular weight of 250 to 350.

* * * * *